(12) United States Patent
Anderson et al.

(10) Patent No.: US 6,383,445 B1
(45) Date of Patent: May 7, 2002

(54) SUPERSONIC COHERENT GAS JET FOR PROVIDING GAS INTO A LIQUID

(75) Inventors: John Erling Anderson, Somers; Pravin Chandra Mathur, Bronx, both of NY (US)

(73) Assignee: Praxair Technology, Inc., Danbury, CT (US)

( * ) Notice: Subject to any disclaimer, the term of this patent is extended or adjusted under 35 U.S.C. 154(b) by 0 days.

(21) Appl. No.: 09/680,969

(22) Filed: Oct. 6, 2000

Related U.S. Application Data

(62) Division of application No. 09/098,430, filed on Jun. 17, 1998, now Pat. No. 6,176,894.

(51) Int. Cl.$^7$ ................................................ C21C 5/32
(52) U.S. Cl. ......................... 266/225; 266/268; 266/47
(58) Field of Search ................................ 266/225, 268, 266/47; 75/414

(56) References Cited

U.S. PATENT DOCUMENTS

| | | |
|---|---|---|
| 2,380,570 A | 7/1945 | Babcock .................... 158/27.4 |
| 3,216,714 A | 11/1965 | Eibl et al. ...................... 266/34 |
| 3,427,151 A | 2/1969 | Koudelka et al. .............. 75/59 |
| 3,889,933 A | 6/1975 | Jaquay ......................... 266/34 |
| 3,972,517 A | 8/1976 | Kraizinger et al. ......... 266/225 |
| 4,210,442 A | 7/1980 | Lewis, III et al. ............... 75/60 |
| 4,373,949 A | 2/1983 | Spruell et al. .................. 75/60 |
| 4,426,224 A | 1/1984 | Shimme et al. ................. 75/49 |
| 4,599,107 A | 7/1986 | Masterson .................. 75/59.2 |
| 4,622,007 A | 11/1986 | Gitman ........................ 432/13 |
| 4,797,087 A | 1/1989 | Gitman ........................ 431/10 |
| RE33,464 E | 11/1990 | Gitman ........................ 432/13 |
| 5,100,313 A | 3/1992 | Anderson et al. .............. 431/8 |
| 5,120,026 A | 6/1992 | Bissonnette ................... 266/48 |
| 5,302,325 A | 4/1994 | Cheng .......................... 261/76 |
| 5,569,180 A | 10/1996 | Spears ........................ 604/24 |
| 5,599,375 A | 2/1997 | Gitman ...................... 76/10.42 |
| 5,700,421 A | 12/1997 | Bissonnette ................... 266/48 |
| 5,714,113 A | 2/1998 | Gitman et al. .............. 266/182 |
| 5,814,125 A | 9/1998 | Anderson et al. ............. 75/414 |
| 5,823,762 A | 10/1998 | Anderson et al. .............. 431/8 |
| 6,171,544 B1 * | 1/2001 | Anderson et al. ............. 266/47 |
| 6,176,894 B1 * | 1/2001 | Anderson et al. ............. 75/414 |
| 6,241,510 B1 * | 6/2001 | Anderson et al. .............. 431/8 |
| 6,261,338 B1 * | 7/2001 | Mahoney et al. ............. 75/414 |

FOREIGN PATENT DOCUMENTS

| | | |
|---|---|---|
| WO | WO8902051 | 3/1989 |

OTHER PUBLICATIONS

Stoecker et al.. Fundamental Concepts Of Oxygen Cutting, Welding Journal, 3/57 pp 151–156, No Date.–

* cited by examiner

Primary Examiner—Scott Kastler
(74) Attorney, Agent, or Firm—Stanley Ktorides

(57) ABSTRACT

A system for establishing and maintaining a supersonic coherent gas jet, effective with either an oxidizing or an inert gas, employing a converging/diverging nozzle for establishment of a non-disruptive initial supersonic velocity, and a slower moving defined triple layered flame envelope coaxial with the jet for effective maintenance of the supersonic velocity. The invention is particularly useful for providing gas into a pool of liquid.

3 Claims, 3 Drawing Sheets

SUPERSONIC COHERENT GAS JET FOR PROVIDING GAS INTO A LIQUID

This application is a divisional application of U.S. application Ser. No. 09/098,430, filed on Jun. 17, 1998, now U.S. Pat. No. 6,176,894.

TECHNICAL FIELD

This invention relates generally to a method for producing and maintaining a supersonic flow of gas. The invention is particularly advantageous when the composition of the gas changes. The invention may be used to provide gas into a liquid.

BACKGROUND ART

It is often desired to establish a flow of gas. For example, a flow of gas may be injected into a liquid for one or more of several reasons. A reactive gas may be injected into a liquid to react with one or more components of the liquid, such as, for example, the injection of oxygen into molten iron to react with carbon within the molten iron to decarburize the iron and to provide heat to the molten iron. Oxygen may be injected into other molten metals such as copper, lead and zinc for smelting or refining purposes or into an aqueous liquid or hydrocarbon liquid to carry out an oxidation reaction. A non-oxidizing gas, such as an inert gas, may be injected into a liquid to stir the liquid in order to promote, for example, better temperature distribution or better component distribution throughout the liquid.

Often the liquid is contained in a vessel such as a reactor or a melting vessel wherein the liquid forms a pool within the vessel conforming to the bottom and some length of the sidewalls of the vessel, and having a top surface. When injecting gas into the liquid pool, it is desirable to have as much gas as possible flow into the liquid to carry out the intent of the gas injection. Accordingly gas is injected from a gas injection device into the liquid below the surface of the liquid. If the nozzle for a normal gas jet were spaced some distance above the liquid surface, then much of the gas impinging on the surface will be deflected at the surface of the liquid and will not enter the liquid pool. Moreover, such action causes splashing of the liquid which can result in loss of material and in operating problems.

Submerged injection of gas into liquid using bottom or side wall mounted gas injection devices, while very effective, has operational problems when the liquid is a corrosive liquid or is at a very high temperature, as these conditions can cause rapid deterioration of the gas injection device and localized wear of the vessel lining resulting in both the need for sophisticated external cooling systems and in frequent maintenance shut-downs and high operating costs. One expedient is to bring the tip or nozzle of the gas injection device close to the surface of the liquid pool while avoiding contact with the liquid surface and to inject the gas from the gas injection device at a high velocity so that a significant portion of the gas passes into the liquid. However, this expediency is still not satisfactory because the proximity of the tip of the gas injection device to the liquid surface may still result in significant damage to this equipment. Moreover, in cases where the surface of the liquid is not stationary, the nozzle would have to be constantly moved to account for the moving surface so that the gas injection would occur at the desired location and the required distance between the lance tip and bath surface would be maintained. For electric arc furnaces, this requires complicated hydraulically driven lance manipulators which are expensive and require extensive maintenance.

Another expedient is to use a pipe which is introduced through the surface of the liquid pool. For example, non-water cooled pipes are often used to inject oxygen into the molten steel bath in an electric arc furnace. However, this expediency is also not satisfactory because the rapid wear of pipe requires complicated hydraulically driven pipe manipulators as well as pipe feed equipment to compensate for the rapid wear rate of the pipe. Moreover, the loss of pipe, which must be continuously replaced, is expensive.

These problems can be solved if a coherent jet can be established. A coherent gas jet retains its diameter and velocity, after ejection from a nozzle, far longer than does a normal gas jet. With a coherent jet, the injector tip may be positioned significantly further from the liquid surface while still enabling virtually all of the gas within the coherent gas jet to penetrate the liquid surface.

It is known that a coherent jet of an oxidizing gas can be established by surrounding the jet of oxidizing gas upon its ejection from a nozzle with a flame envelope formed by an annular stream of fuel around the oxidizing gas jet and a stream of oxidant annular to fuel stream. The fuel and oxidant combust to form the flame envelope which flows coaxially with the oxidizing gas stream and maintains it coherent for a long distance after ejection from the nozzle. However, this flame envelope arrangement does not work well if the gas is an inert gas. In such situations the velocity of the gas jet is quickly reduced and the coherency of the inert gas jet deteriorates rapidly. This is a particular problem where it is desired to switch from an oxidizing to an inert gas as this requires alteration of the gas lance ejection system.

Accordingly, it is an object of this invention to provide a method for maintaining the velocity and the coherency of a gas jet irrespective of whether the gas jet is an oxidizing or an inert gas jet.

It is another object of this invention to provide a method for maintaining the velocity and the coherency of a gas jet while enabling the composition of the gas jet to be changed.

SUMMARY OF THE INVENTION

The above and other objects, which will become apparent to one skilled in the art upon a reading of this disclosure, are attained by the present invention one aspect of which is:

A method for establishing a high velocity coherent main gas stream comprising:

(A) ejecting a main gas from a lance having a converging/diverging nozzle to form a main gas stream having a supersonic velocity;

(B) ejecting a flow of first oxidant from the lance annularly to the main gas stream, said flow of first oxidant having a velocity less than that of the main gas stream;

(C) ejecting a flow of fuel from the lance annularly to the flow of first oxidant, said flow of fuel having a velocity less than that of the main gas stream;

(D) ejecting a flow of second oxidant from the lance annularly to the flow of fuel, said flow of second oxidant having a velocity less than that of the main gas stream; and (E) combusting fuel with at least one of the first oxidant and the second oxidant to form a flame envelope around the main gas stream.

Another aspect of the invention is:

Apparatus for establishing a high velocity coherent main gas stream comprising:

(A) a lance having a main gas passageway communicating with a converging/diverging nozzle for ejecting a main gas into an ejection space;

(B) first passage means within the lance for ejecting a flow of first oxidant into the ejection space annularly to the main gas stream;

(C) second passage means within the lance for ejecting a flow of fuel into the ejection space annularly to the flow of first oxidant; and (D) third passage means within the lance for ejecting a flow of second oxidant into the ejection space annularly to the flow of fuel.

A further aspect of the invention is:

A method for providing gas into a liquid comprising:

(A) ejecting a main gas from a lance having a converging/diverging nozzle to form a main gas stream having a supersonic velocity;

(B) ejecting a flow of first oxidant from the lance annularly to the main gas stream, said flow of first oxidant having a velocity less than that of the main gas stream;

(C) ejecting a flow of fuel from the lance annularly to the flow of first oxidant, said flow of fuel having a velocity less than that of the main gas stream;

(D) ejecting a flow of second oxidant from the lance annularly to the flow of fuel, said flow of second oxidant having a velocity less than that of the main gas stream;

(E) combusting fuel with at least one of the first oxidant and the second oxidant to form a flame envelope around the main gas stream; and (F) passing gas from the main gas stream into a liquid.

As used herein, the term "annularly" means in the form of a ring.

As used herein, the term "inert gas" means a pure gas or a gas mixture having an oxygen concentration which is less than 5 mole percent.

As used herein, the term "oxidizing gas" means a pure gas or a gas mixture having an oxygen concentration of at least 5 mole percent.

As used herein, the term "flame envelope" means an annular combusting stream substantially coaxial with the main gas stream.

Figure 1:
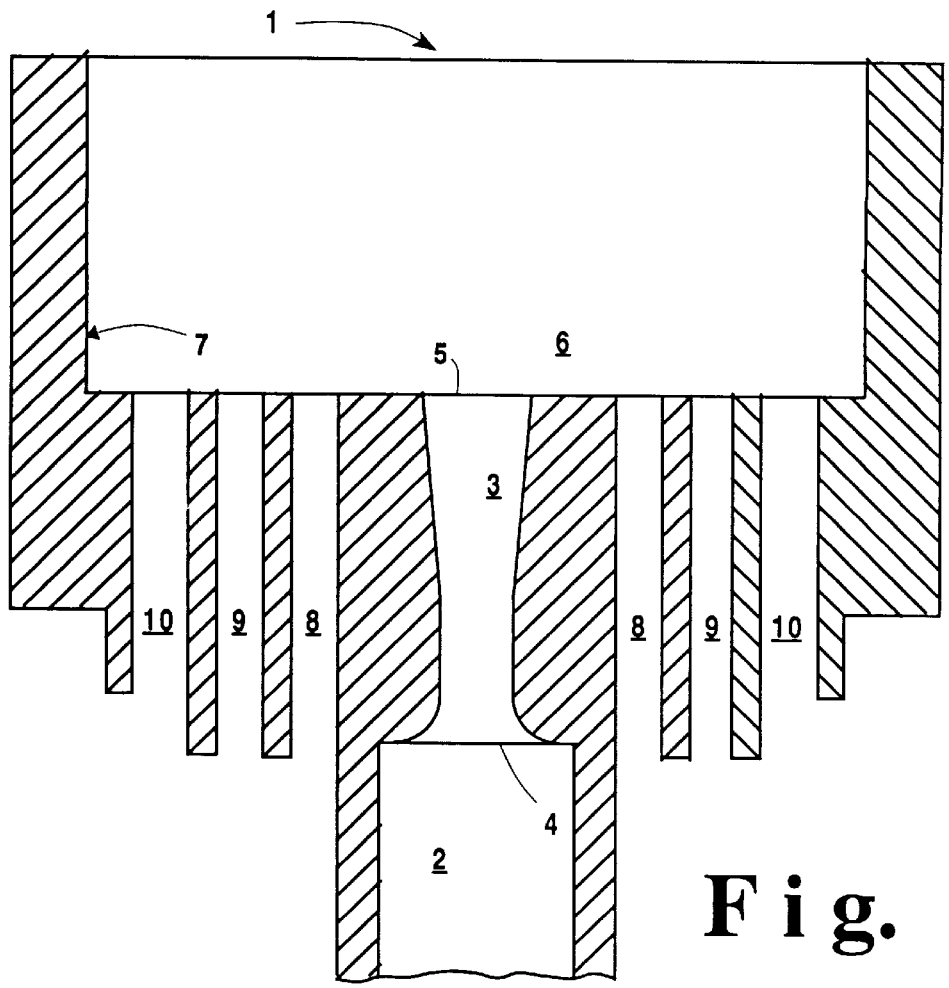
FIG. 1 is a cross sectional view of one embodiment of the tip section of a lance which may be used in the practice of this invention.

The numerals in the drawings are the same for the common elements.

DETAILED DESCRIPTION

The invention enables the establishment and maintenance of a coherent gas jet irrespective of whether the gas is an oxidizing gas or an inert gas and, furthermore, enables the gas to change, such as from an oxidizing to an inert jet, or vice versa, with no significant deterioration of the coherency and without requiring any equipment change beyond that necessary to supply the different main gas. Moreover, the invention enables the oxygen concentration of an oxidizing main gas to change without encountering any significant loss of coherency in the main gas jet.

Figure 3:
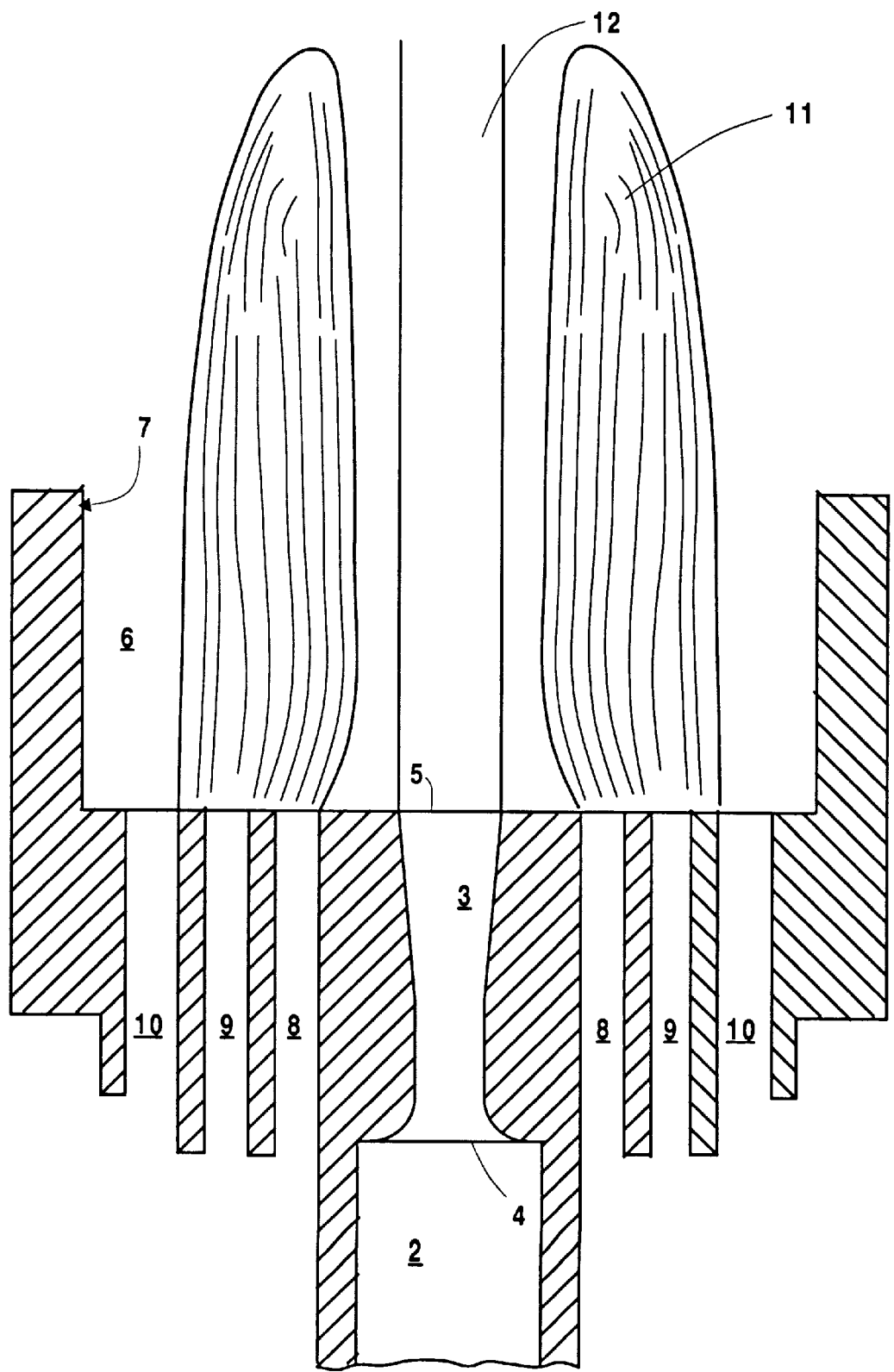
FIG. 3 is a representation of the lance shown in FIG. 1 in operation.

The invention will be described in detail with reference to the drawings. Referring now to FIGS. 1 and 3, there is shown in cross section lance tip section 1 of a lance which may be used to practice the invention. Lance tip section 1 includes a main gas passageway 2 which communicates with a source of main gas (not shown). The main gas may be an oxidizing gas or an inert gas. Examples of an oxidizing gas include air, oxygen-enriched air having an oxygen concentration of at least 30 mole percent, particularly at least 90 mole percent, and technically pure oxygen having an oxygen concentration of 99.5 mole percent or more. Examples of an inert gas include nitrogen, argon, carbon dioxide, hydrogen, helium, gaseous hydrocarbon and mixtures comprising two or more thereof.

Main gas passageway 2 communicates with converging/diverging nozzle 3 at nozzle inlet 4. The nozzle has an outlet 5 which communicates with ejection space 6 into which the gases are injected. Nozzle outlet 5 has a diameter generally within the range of from 0.1 to 3 inches, preferably within the range of from 0.5 to 2 inches. Preferably, as illustrated in FIGS. 1 and 3, ejection space 6 is initially confined by lance tip extension section 7 and then opens up into a larger volume downstream of extension section 7. The extension section 7 typically has a length of from 0.5 to 4 inches and serves to stabilize the combustion of the annular fuel and oxidant to form a flame envelope 11 having a greater stability in the initial stages upon ejection from the lance tip section than would be the case without use of the extension section to form the confined initial ejection space.

Main gas passes from the main gas source through main gas passageway 2 and into nozzle 3 through inlet 4. The gas accelerates in the diverging portion of the nozzle so that it is at supersonic velocity when it is ejected from nozzle outlet 5 into ejection space 6. The converging/diverging nozzle enables the initial attainment of supersonic velocity without disruption. A straight bore nozzle would cause the expansion of the gas to attain supersonic velocity to occur after the gas leaves the nozzle causing several expansion and contraction pulsation cycles before a steady state is reached someplace downstream of the nozzle outlet. The velocity of the main gas stream 12 ejected from nozzle outlet 5 is supersonic, i.e. it exceeds Mach 1, and preferably is within the range of from Mach 1.2 to Mach 3.0 when ejecting the main gas into an atmosphere at atmospheric pressure.

Radially spaced from main gas passageway 2 is first annular passageway 8, radially spaced from first annular passageway 8 is second annular passageway 9, and radially spaced from second annular passageway 9 is third annular passageway 10. First annular passageway 8 communicates with a source of first oxidant (not shown) which preferably is a fluid having an oxygen concentration of at least 30 mole percent, most preferably at least 90 mole percent, and can be technically pure oxygen. The first oxidant passes through first annular passageway 8 and is ejected from the lance into ejection space 6 in a flow annular to the main gas stream and having a velocity less than that of the main gas stream. Generally the flow of first oxidant will have a velocity within the range of from 300 to 1500 feet per second (fps).

Second annular passageway 9 communicates with a source of fuel (not shown). The fuel may be any fluid fuel such as methane, propane, butylene, natural gas, hydrogen, coke oven gas, or oil. The fuel may be diluted with a diluent, such as, for example, nitrogen. The fuel passes through second annular passageway 9 and is ejected from the lance into ejection space 6 in a flow annular to the flow of first oxidant and having a velocity less than that of the main gas stream. Generally the flow of fuel will have a velocity within the range of from 300 to 1500 fps. Preferably the flow of fuel will have a velocity about the same as the velocity of the flow of first oxidant.

Third annular passageway 10 communicates with a source of second oxidant (not shown) which may be the same as the source of first oxidant. That is, the second oxidant may have, and preferably does have, the same composition as the first oxidant. Preferably the second oxidant is a fluid having an oxygen concentration of at least 30 mole percent, most preferably at least 90 mole percent, and can be technically pure oxygen. The second oxidant passes through third annular passageway 10 and is ejected from the lance into ejection space 6 in a flow annular to the flow of fuel and having a velocity less than that of the main gas stream and preferably less than that of the flow of first oxidant. Preferably the flow of second oxidant has a velocity less than that of the flow of fuel. Generally the flow of second oxidant will have a velocity within the range of from 100 to 1500 fps and preferably within the range of from 100 to 500 fps.

Figure 2:
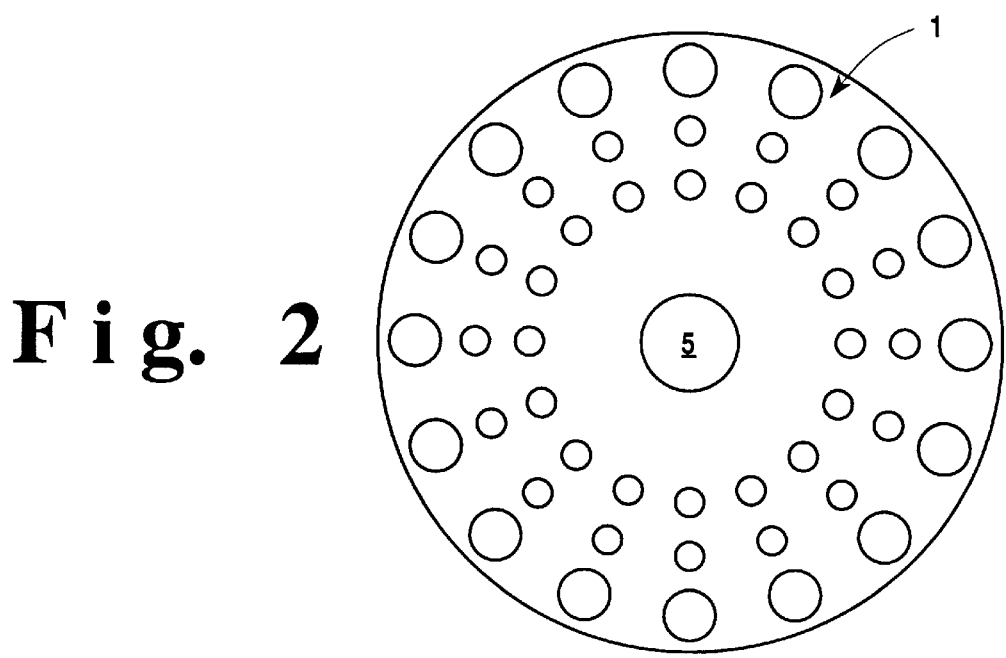
FIG. 2 is a head on view of the lance tip section illustrated in FIG. 1.

Each of the first, second and third annular passageways communicates with ejection space 6 preferably, as illustrated in FIGS. 1 and 3, even or flush with outlet 5 of converging/diverging nozzle 3. Preferably, as shown in FIG. 2, each of the first, second and third annular passageways becomes a plurality of individual passages such that each of the first, second and third annular passageways communicates with ejection space 6 as a ring of holes around outlet 5. Alternatively, one or more of the first, second and third annular passageways could communicate with injection volume 6 as a circular annulus to outlet 5.

Upon ejection into the ejection space the fuel mixes with and combusts with at least one, and preferably with both, of the first and second oxidants to form a flame envelope 11 around the main gas stream 12. If the invention is employed in a hot environment such as a metal melting furnace, no separate ignition source for the fuel and oxidant is required. If the invention is not employed in an environment wherein the fuel and oxidant will auto ignite, an ignition source such as a spark generator will be required. The flame envelope will have a velocity less than the velocity of the main gas stream and generally within the range of from 50 to 1000 fps.

The triple layered slower moving flame envelope 11 around the initially supersonic main gas stream 12 from the converging/diverging nozzle serves to maintain the gas stream coherent, i.e. with little loss of velocity and with little expansion of the width of the main gas stream, for a significant distance from the nozzle, generally at least 20 nozzle outlet diameters (d) and up to 100d or more while still maintaining supersonic velocity. This enables the placement of the lance such that the lance tip is spaced by a larger distance from where the main gas impacts or otherwise engages a liquid or solid, thus enhancing safety and better preserving the integrity of the lance. Preferably the main gas impacts the target liquid or solid at supersonic velocity and preferably the flame envelope extends substantially from the lance tip to the surface of the target liquid or solid.

Generally the amount of fuel and oxidant provided from the lance will be just enough to form an effective flame envelope for the desired length of the main gas stream. However there may be times when it is desired that significantly more fuel and oxidant is passed out from the lance so that the flame envelope not only serves to shield the main gas stream from entrainment of ambient gas, but also serves to provide significant heat into the injection volume. That is, the lance may, in some embodiments of this invention, function also as a burner.

Figure 4:
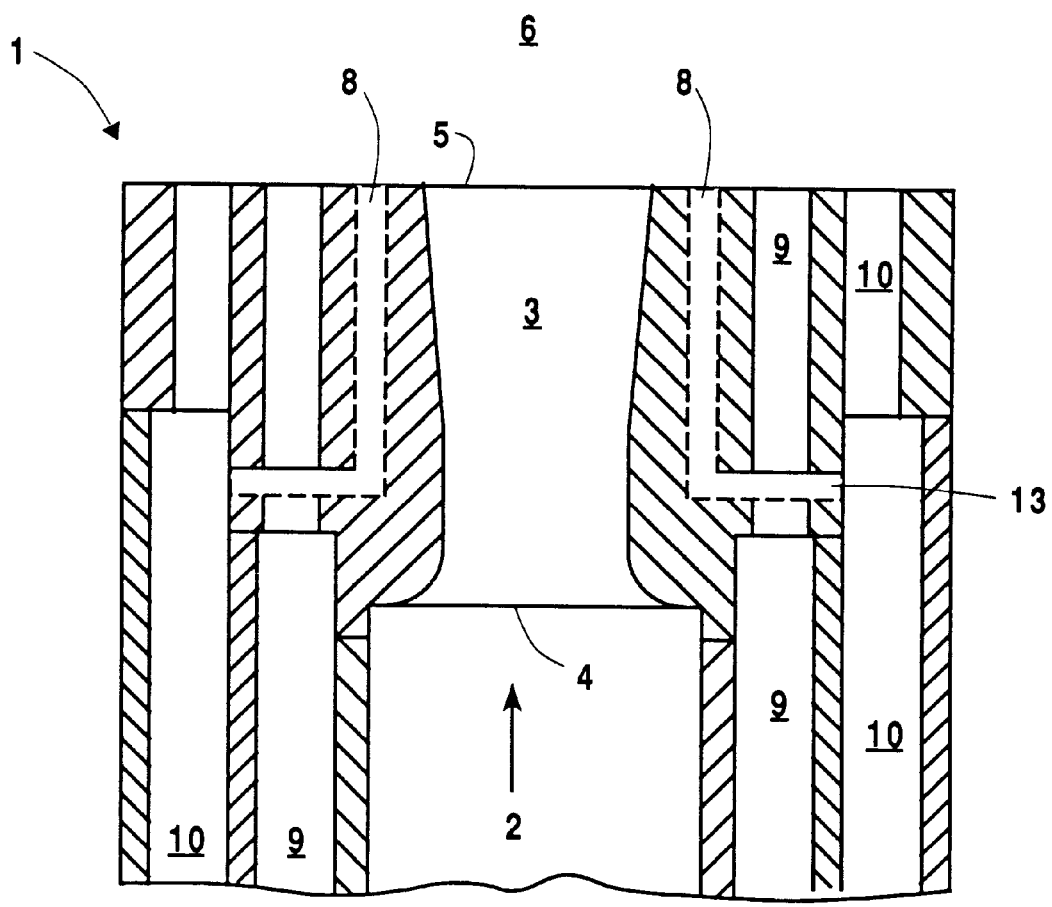
FIG. 4 is a cross sectional view of another embodiment of the tip section of a lance which may be used in the practice of this invention.

FIG. 4 illustrates another embodiment of the lance tip of the invention wherein the first annular passageway communicates with the third annular passageway within the lance such that the first annular passageway receives the oxidant for ejection into the ejection volume from the third annular passageway by way of internal connecting passage 13. Connecting passage 13 is sized to ensure that the velocity difference between the first oxidant stream and the second oxidant stream is attained in the preferred embodiment of the invention.

The invention will find particular utility for the injection of a gas into a liquid where it is desired to keep the lance tip out of the liquid and, moreover, significantly spaced from the surface of the liquid. For example the invention may be used to provide a gaseous reactant into a hydrocarbon or aqueous liquid, such as for an oxidation, hydrogenation or nitrogenation reaction. It will be particularly useful where the liquid is a corrosive liquid, such as a highly acidic or basic liquid, or where the liquid has a very high temperature, such as molten metal. One particularly effective use of the invention is to provide oxygen, the main gas, into molten metal to react with carbon in the molten metal to decarburize the metal and to provide heat to the molten metal. Thereafter the main gas can be changed to be an inert gas such as argon, without any other change in equipment or flows to the annular passageways, to provide the argon into the molten metal to stir the molten metal and better distribute the heat. This changeover can be done relatively quickly and without the heretofore experienced loss in the efficacy of the establishment of the coherent main gas jet.

A particularly advantageous use of this invention is for injecting gases having differing oxygen concentrations into a liquid such as molten metal, without need for any other major change when the oxygen concentration of the main gas is changed. For example, in the making of stainless steel, the invention may be used to provide a coherent main gas stream into the molten metal from a lance having a tip spaced a significant distance from the surface of molten metal. Such lance injection may be used in place of conventional gas injection through submerged tuyeres. During the initial stages of the stainless steel process, the main gas stream is comprised of an oxidizing gas such as pure oxygen or a fluid mixture having an oxygen concentration of about 75 mole percent wherein the balance is nitrogen, argon or carbon dioxide. As the refining process continues, the concentration of the oxygen in the main gas is decreased in a programmed manner. Eventually in the latter portion of the refining process the main gas becomes an inert gas. The invention and its advantages will be further illustrated in connection with the following examples and comparative examples. The examples are presented for illustrative purposes and are not intended to be limiting.

In order to demonstrate known systems, a lance having a lance tip similar to that illustrated in the FIGS. 1 and 3, but without the third annular passageway, was employed. The converging/diverging nozzle had a throat diameter of 0.358 inch and an outlet diameter of 0.526 inch. Pure oxygen was ejected from the nozzle to form a main gas stream having an initial velocity of 1720 fps. Natural gas was passed into the injection volume from the first annular passageway at a velocity of 610 fps and pure oxygen was passed into the injection volume from the second annular passageway at a velocity of 410 fps forming a flame envelope around the main oxygen gas stream. The velocity of the main gas stream at its axis was measured at a distance 36 inches from the nozzle outlet and it was found that there was only a small drop from its initial velocity. The normalized velocity of the oxygen main gas stream, i.e. its jet axis velocity 36 inches from the nozzle outlet divided by its initial jet axis velocity, was 0.95 or 95%. However, when the test was repeated using pure nitrogen at an initial velocity of 1840 fps as the main gas, its normalized velocity was only 43 percent.

The deterioration of the nitrogen gas jet velocity was reduced somewhat by reversing the order of the fuel and oxidant which form the flame envelope. That is, the oxygen was provided through the first annular passageway and the natural gas was provided through the second annular passageway. In this test the normalized velocity of the nitrogen improved to 73%. However, when this test was repeated using oxygen as the main gas, the normalized velocity of the oxygen deteriorated to 81 percent.

A similar lance tip but with a third annular passageway, such as that illustrated in FIGS. 1 and 3, was used to demonstrate the invention. The procedure was similar to that previously described except that pure oxygen was ejected into the ejection space from the first annular passageway at a velocity of 610 fps, natural gas was ejected into the ejection space from the second annular passageway at a velocity of 610 fps, and pure oxygen was ejected into the ejection space from the third annular passageway at a velocity of 270 fps to form the flame envelope. When oxygen was used as the main gas its normalized velocity was 90 percent which was a significant improvement over the 81 percent previously attained when the main gas was an oxidizing gas and the gas of the flame envelope closest to the main gas was an oxidant. Moreover, when the main gas was switched to nitrogen, its normalized velocity was 89 percent, which was a significant improvement over all the known arrangements and demonstrates that the invention can be used with good effectiveness to establish and maintain a coherent jet using either an oxidizing or an inert gas for the coherent jet.

While not wishing to be held to any theory applicants believe that the advantageous results achieved with their invention are due, at least in part, to the maintenance of the flame envelope closer to the main gas jet. The low velocity outer annular oxidant stream, which is in contact with the middle annular fuel stream, serves to stabilize a flame at the nozzle face. The flame stability is enhanced by providing an extension causing some of the hot combustion gases to circulate near the nozzle face thereby acting as a continuous ignition source. The inner annular oxidant stream mixes with the middle annular fuel stream providing an oxygen rich, fuel-oxygen mixture very close to the main gas jet perimeter. This oxygen rich atmosphere maintains the flame envelope close to the main gas jet perimeter. The presence of the inner annular oxidant stream is especially efficacious when the main gas is an inert gas containing little or no oxygen.

Now by the use of this invention one can establish and maintain over a long distance a supersonic coherent gas jet with about the same effectiveness irrespective of whether the gas jet is an oxidizing gas or an inert gas. Although the invention has been described in detail with reference to certain preferred embodiments, those skilled in the art will recognize that there are other embodiments of the invention within the spirit and scope of the claims.

What is claimed is:

1. Apparatus for establishing a high velocity coherent main gas stream comprising:

(A) a lance having a main gas passageway communicating with a converging/diverging nozzle for ejecting a main gas into an ejection space;

(B) first passage means within the lance for ejecting a flow of first oxidant into the ejection space annularly to the main gas stream;

(C) second passage means within the lance for ejecting a flow of fuel into the ejection space annularly to the flow of first oxidant; and (D) third passage means within the lance for ejecting a flow of second oxidant into the ejection space annularly to the flow of fuel, wherein each of the first, second and third passages are oriented parallel with the nozzle and wherein each of the first, second and third passages communicates with the ejection space flush with the nozzle outlet.

2. The apparatus of claim 1 further comprising an extension on the lance for forming the ejection space.

3. The apparatus of claim 1 further comprising a connecting passage within the lance enabling the first passage means to communicate with the third passage means.

* * * * *